US 8,997,129 B2

(12) United States Patent
Nishina et al.

(10) Patent No.: US 8,997,129 B2
(45) Date of Patent: Mar. 31, 2015

(54) OPTICAL DISC DEVICE

(71) Applicant: Funai Electric Co., Ltd., Osaka (JP)

(72) Inventors: Yasuhiro Nishina, Osaka (JP); Yasuhide Mizuta, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/245,332

(22) Filed: Apr. 4, 2014

(65) Prior Publication Data
US 2014/0310734 A1 Oct. 16, 2014

(30) Foreign Application Priority Data

Apr. 15, 2013 (JP) ................................. 2013-085148

(51) Int. Cl.
*G11B 17/056* (2006.01)
*G11B 17/05* (2006.01)
(52) U.S. Cl.
CPC ...................................... *G11B 17/05* (2013.01)
USPC .......................................... 720/692; 720/607
(58) Field of Classification Search
CPC .................................................... G11B 17/056
USPC .................. 720/607, 613, 689, 692, 706, 709
See application file for complete search history.

(56) References Cited

U.S. PATENT DOCUMENTS

| 5,317,464 A * | 5/1994 | Witt et al. .................. 360/99.08 |
| 8,037,489 B2 | 10/2011 | Hayashi et al. |
| 2003/0142611 A1* | 7/2003 | Kume ........................... 369/75.2 |
| 2009/0083776 A1 | 3/2009 | Hayashi et al. |

FOREIGN PATENT DOCUMENTS

| JP | 2002-272069 | 9/2002 |
| JP | 2006-24319 | 1/2006 |
| JP | 2008-84435 | 4/2008 |
| JP | 2008-198278 | 8/2008 |
| JP | 2008-282445 | 11/2008 |
| JP | 2009-76150 | 4/2009 |
| JP | 2012-99183 | 5/2012 |

* cited by examiner

*Primary Examiner* — Brian Miller
*Assistant Examiner* — Carlos E Garcia
(74) *Attorney, Agent, or Firm* — Wenderoth, Lind & Ponack, LLP

(57) ABSTRACT

An optical disc device includes: a loader body having a guiding recess formed of a linear portion and a sloped portion; a traverse chassis mounted in the loader body and having a protrusion that is guided along the recess; a turntable mounted on the traverse chassis, for mounting the optical disc; and a clamper which clamps the optical disc between the clamper and the turntable when the traverse chassis ascends relative to the loader body to a clamp position, in which when the traverse chassis is at a position lower than the clamp position, the protrusion is guided along the recess, and when the traverse chassis is at the clamp position, the protrusion is positioned inside the sloped portion.

5 Claims, 7 Drawing Sheets

OPTICAL DISC DEVICE

CROSS REFERENCE TO RELATED APPLICATION

The present application is based on and claims priority of Japanese Patent Application No. 2013-085148 filed on Apr. 15, 2013. The entire disclosure of the above-identified application, including the specification, drawings and claims is incorporated herein by reference in its entirety.

BACKGROUND OF THE INVENTION

1. Technical Field

The present invention relates to an optical disc device for reproducing information recorded on an optical disc or recording information on the optical disc.

2. Description of the Related Art

An optical disc device for reproducing information recorded on an optical disc or recording information on the optical disc is known. The optical disc device includes a loader body and a traverse chassis attached to the loader body to be vertically movable. The traverse chassis supports a turntable for mounting the optical disc, a spindle motor for rotating the turntable, and an optical pickup for irradiating the optical disc with a laser beam.

The optical disc device further includes a guide mechanism for guiding the ascending and descending motion of the traverse chassis (e.g., Japanese Unexamined Patent Application Publication No. 2006-24319). FIG. 7 illustrates a guide mechanism in a conventional optical disc device. As illustrated in FIG. 7, the conventional guide mechanism has a recess 102 in a loader body 100 and a protrusion 104 protruding from a traverse chassis (not illustrated in FIG. 7). The recess 102 extends in the vertical direction, and has an open upper end. The protrusion 104 is movably inserted into the recess 102. When the protrusion 104 is guided along the recess 102, the ascending and descending motion of the traverse chassis is limited to the vertical direction.

When the traverse chassis ascends relative to the loader body 100, an optical disc (not illustrated in FIG. 7) mounted on the turntable (not illustrated in FIG. 7) is clamped between the turntable and a clamper (not illustrated in FIG. 7). In the state where the optical disc is clamped, the protrusion 104 is guided to the upper end of the recess 102, as illustrated in FIG. 7. Therefore, when the traverse chassis oscillates with the rotation of the optical disc, rattling occurs between the protrusion 104 and the recess 102. This may cause an unusual sound (i.e., chattering noise).

To suppress such unusual sound, a resin flat spring (not illustrated in FIG. 7) is provided in the loader body 100. The flat spring presses the traverse chassis from a side. Thus, the protrusion 104 is held down to the recess 102. Therefore, when the traverse chassis oscillates, the rattling between the protrusion 104 and the recess 102 can be suppressed.

SUMMARY OF THE INVENTION

1. Technical Problem

However, the following problems arise in the conventional optical disc device described above. When a resin flat spring is exposed to a high temperature for a long time, the spring load generally declines due to creep deformation. Therefore, the creep deformation of the flat spring provided to the loader body decreases a force to hold down the protrusion 104 to the recess 102. Thus, the rattling between the protrusion 104 and the recess 102 cannot be suppressed.

Meanwhile, when a flat spring with a relatively large spring load is provided to the loader body, the spring load of a creep-deformed flat spring can be obtained at a fixed value or greater. However, in a state before the flat spring is creep-deformed, the force to hold down the protrusion 104 to the recess 102 is relatively large. This increases the load of the ascending and descending motion of the traverse chassis. Therefore, the ascending and descending motion of the traverse chassis becomes unstable.

In view of the above problems, the present invention provides an optical disc device capable of preventing the occurrence of an unusual sound due to the oscillation of a traverse chassis and stabilizing the ascending and descending motion of the traverse chassis.

2. Solution to the Problem

To solve the above problems, an optical disc device according to an aspect of the present invention includes: a loader body having a recess and a wide portion, the recess extending in a direction substantially perpendicular to a radial direction of an optical disc, the wide portion being connected to an upper end of the recess and wider than the recess; a traverse chassis provided in the loader body and having a protrusion guided along the recess, the traverse chassis being vertically movable; a turntable provided on the traverse chassis, for mounting the optical disc; and a clamper which clamps the optical disc between the clamper and the turntable when the traverse chassis ascends relative to the loader body to a clamp position, and unclamps the optical disc when the traverse chassis descends from the clamp position, in which when the traverse chassis is at a position lower than the clamp position, the protrusion is guided along the recess, and when the traverse chassis is at the clamp position, the protrusion is positioned inside the wide portion.

According to the present aspect, when the traverse chassis is at the clamp position, the protrusion is positioned inside the wide portion. Therefore, rattling does not occur between the protrusion and the recess when the traverse chassis oscillates with the rotation of the optical disc. This can suppress the occurrence of an unusual sound. Furthermore, the omission of the resin flat spring described in background of the invention can suppress a force to hold down the protrusion to the recess to be relatively small. This can stabilize the ascending and descending motion of the traverse chassis.

For example, in an optical disc device according to an aspect of the present invention, the wide portion may have slopes which slope against the direction in which the recess extends.

According to this aspect, the upper end of the recess is connected to the slopes. Therefore, when the traverse chassis descends from the clamp position and the protrusion rides on a slope, the protrusion moves obliquely downward along the slope. This can ensure that the protrusion is guided along the recess.

For example, in an optical disc device according to an aspect of the present invention, when alignment between the turntable and the clamper is started, the protrusion may be guided along the recess, and when the alignment between the turntable and the clamper is completed, the protrusion may be positioned inside the wide portion.

According to this aspect, when the alignment between the turntable and the damper is started, the protrusion is guided along the recess. This starts the alignment of the turntable and the clamper in the state where the ascending motion of the traverse chassis is limited to the vertical direction. Therefore, the occurrence of misalignment can be suppressed.

3. Advantageous Effects

The optical disc device according to an aspect of the present invention can prevent an unusual sound due to the oscillation of a traverse chassis, and stabilize the ascending and descending motion of the traverse chassis.

BRIEF DESCRIPTION OF THE DRAWINGS

These and other objects, advantages and features of the invention will become apparent from the following description thereof taken in conjunction with the accompanying drawings that illustrate a specific embodiment of the present invention.

DETAILED DESCRIPTION OF THE INVENTION

The following describes optical disc devices according to the embodiments in detail with reference to the drawings. It should be noted that each of the following embodiments shows a preferred specific example of the present invention. Numerical values, shapes, materials, structural elements, the arrangement and connection of the structural elements, and others indicated in the following embodiments are mere examples, and are not intended to limit the present invention. The present invention is defined by the appended claims. Therefore, among the structural elements in the following embodiments, the structural elements not recited in the independent claims are not necessarily needed to solve the problems in the known devices, but are used to form a more preferable embodiment.

Embodiment 1

[Overall Configuration of Optical Disc Device]

Figure 1:
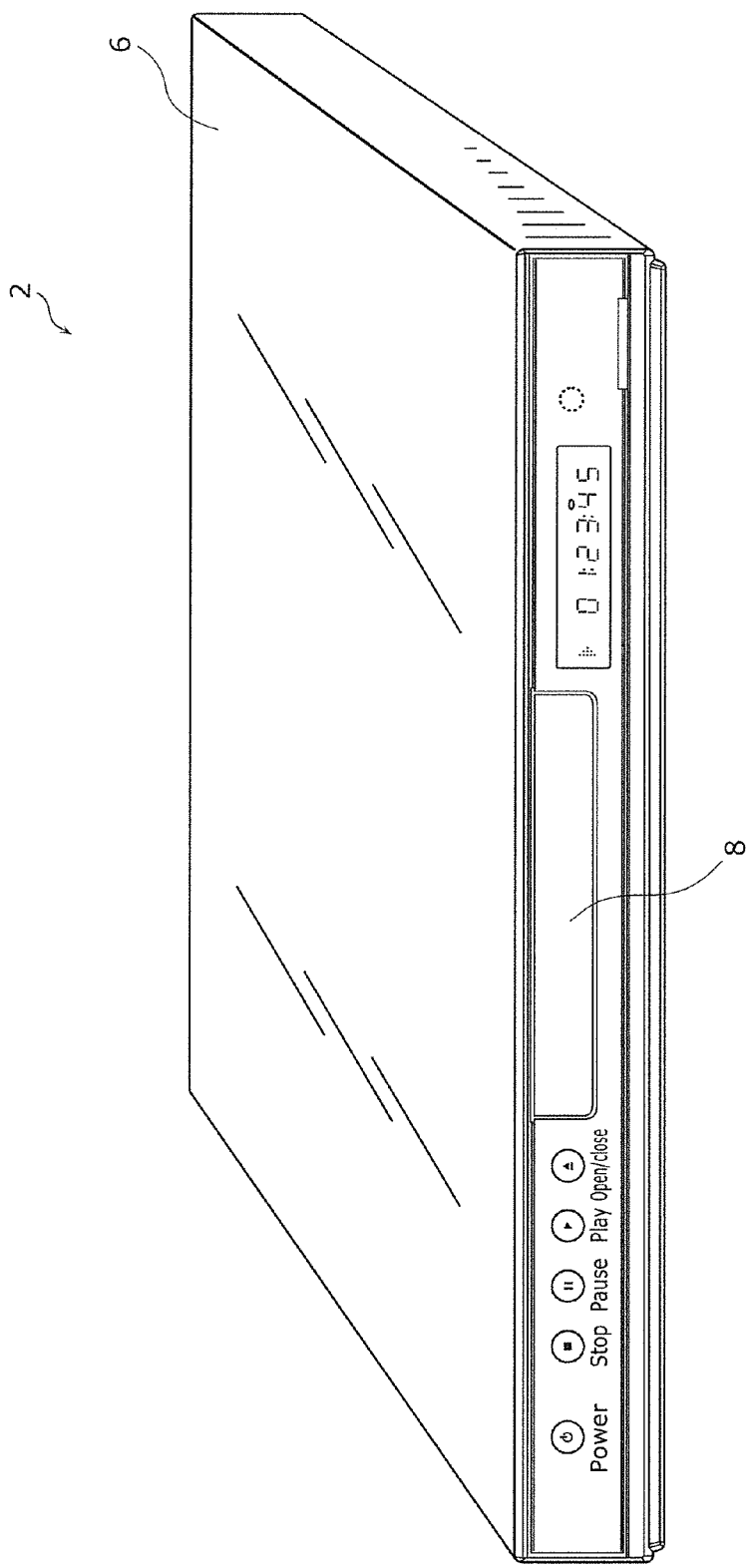
FIG. 1 is a perspective view illustrating the appearance of an optical disc device according to Embodiment 1.
Figure 2:
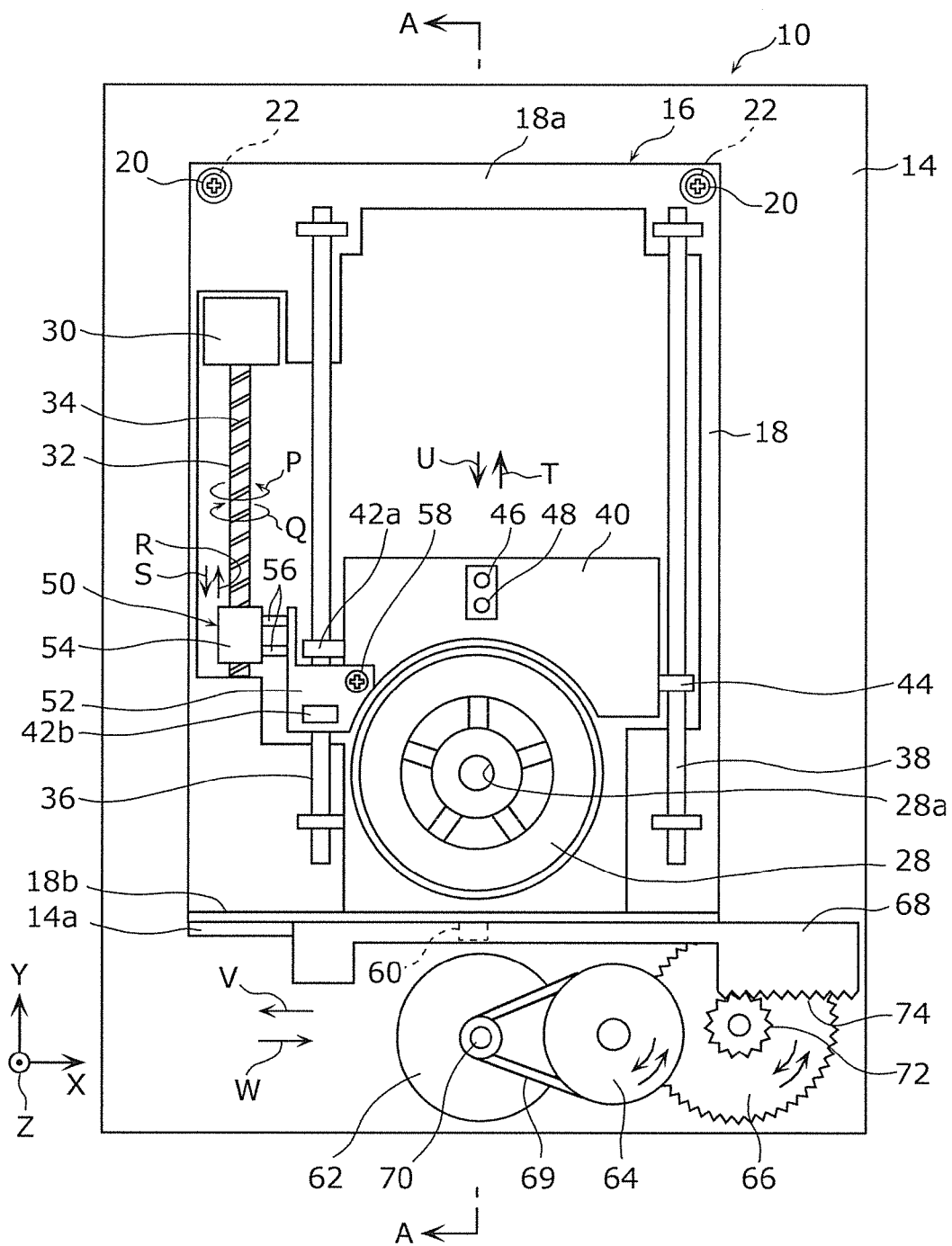
FIG. 2 is a plan view illustrating a loader unit in an optical disc device according to Embodiment 1.
Figure 3A:
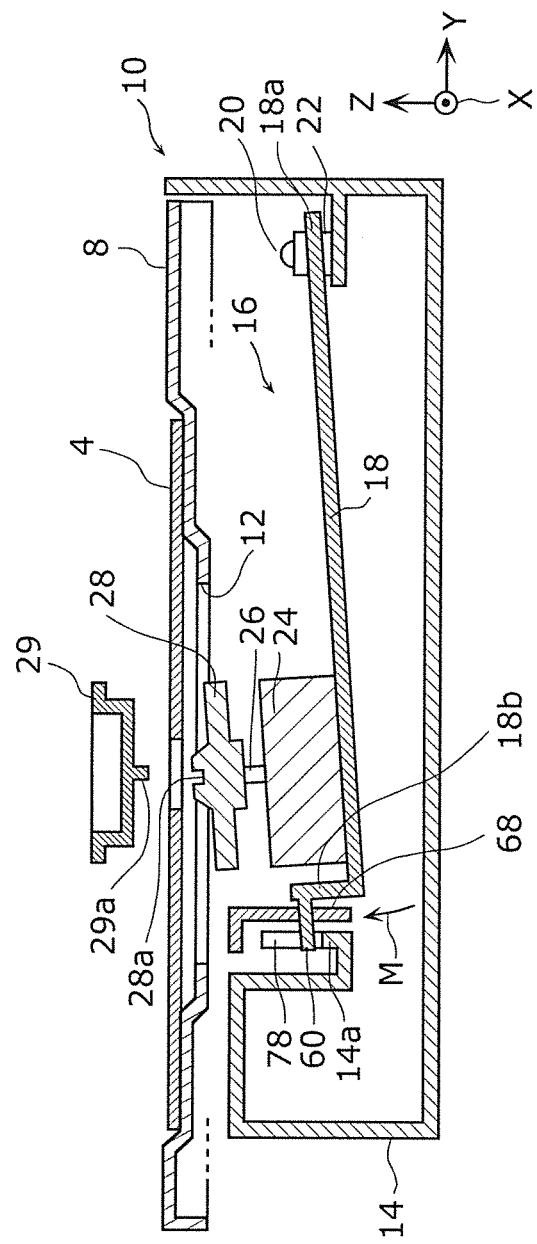
FIG. 3A is a schematic cross-sectional view illustrating a loader unit and a disc tray taken along the line A-A of FIG. 2 in the state where an optical disc is unclamped.
Figure 3B:
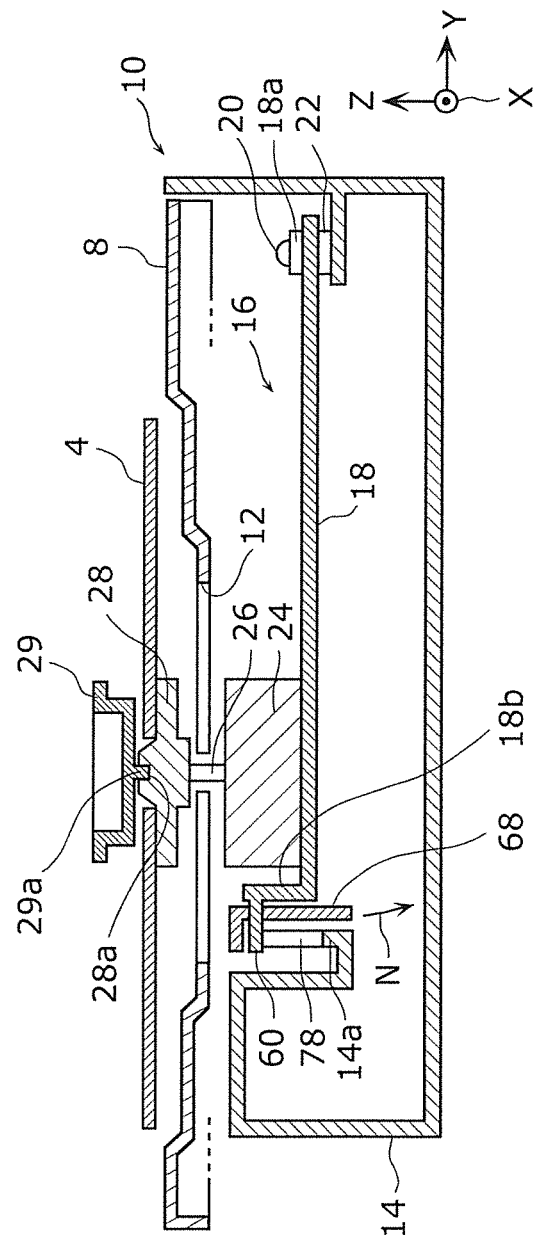
FIG. 3B is a schematic cross-sectional view illustrating a loader unit and a disc tray taken along the line A-A of FIG. 2 in the state where an optical disc is clamped.
Figure 4:
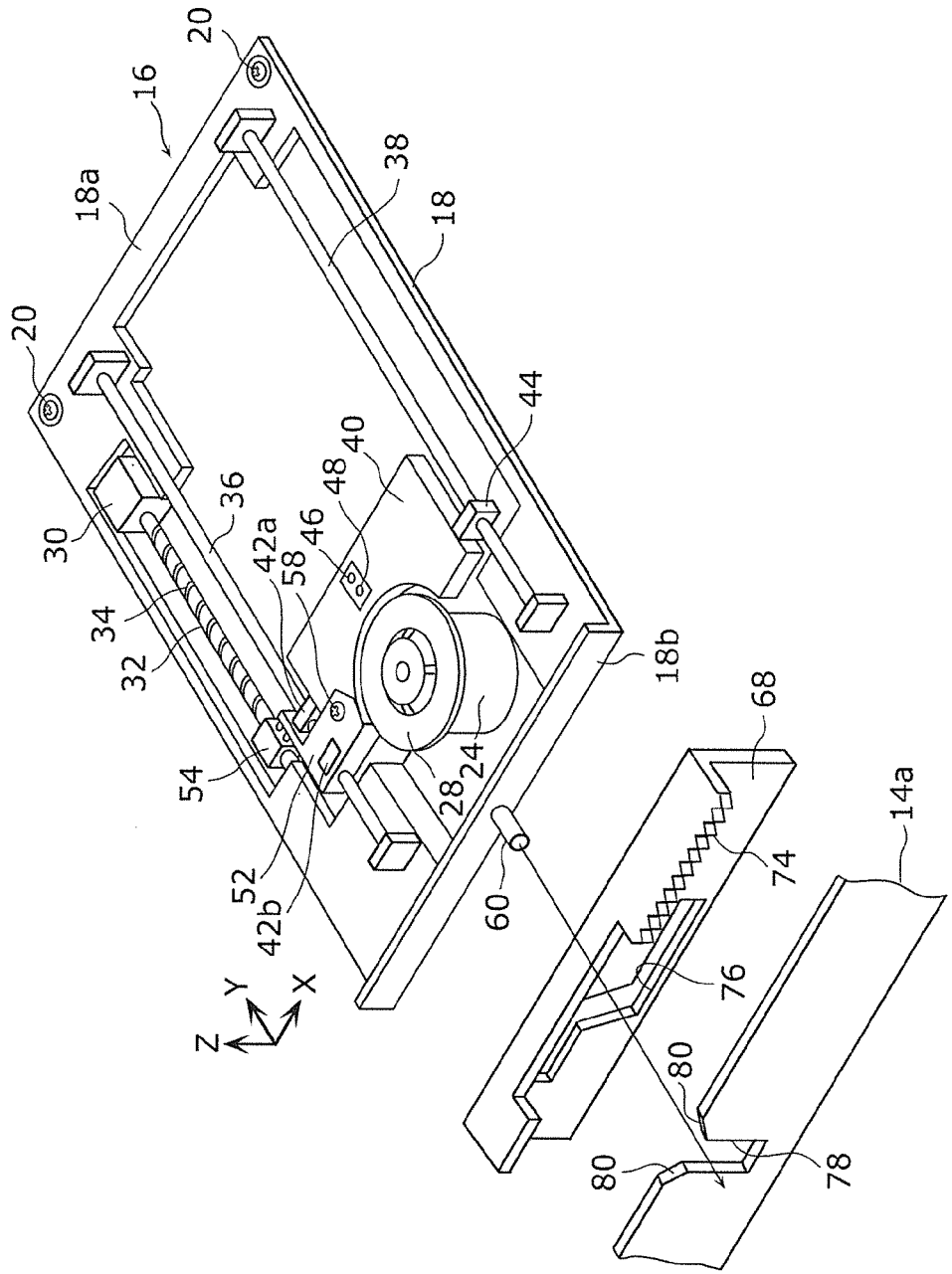
FIG. 4 is a perspective view illustrating the state where a loader unit is partially disassembled.

With reference to FIGS. 1 to 4, the following describes the overall configuration of an optical disc device according to Embodiment 1. FIG. 1 is a perspective view illustrating the appearance of an optical disc device according to Embodiment 1. FIG. 2 is a plan view illustrating a loader unit in an optical disc device according to Embodiment 1. FIG. 3A is a schematic cross-sectional view illustrating a loader unit and a disc tray taken along the line A-A of FIG. 2 in the state where an optical disc is unclamped. FIG. 3B is a schematic cross-sectional view illustrating a loader unit and a disc tray taken along the line A-A of FIG. 2 in the state where an optical disc is clamped. FIG. 4 is a perspective view illustrating the state where a loader unit is partially disassembled. It should be noted that an optical pickup 40 and others are not illustrated in FIGS. 3A and 3B for convenience.

As FIG. 1 illustrates, an optical disc device 2 is, for example, a Blu-ray (a registered trademark) Disc (BD) recorder for reproducing information recorded on an optical disc 4 (see FIGS. 3A and 3B) and recording information on the optical disc 4. It should be noted that the optical disc 4 is, for example, a BD, a digital versatile disc (DVD), or a compact disc (CD).

A disc tray 8 and a loader unit 10 placed below the disc tray 8 are mounted in a housing 6 of the optical disc device 2. The configurations of the disc tray 8 and the loader unit 10 will be described later.

[Configuration of Disc Tray]

As FIGS. 1, 3A, and 3B illustrate, the disc tray 8 is provided for mounting the optical disc 4. The bottom of the disc tray 8 has an opening 12. A driving mechanism (not illustrated in the figures) provided inside the housing 6 allows the disc tray 8 to move back and forth in the Y-axis direction. Specifically, the disc tray 8 can move back and forth between the external position of the housing 6 toward which the disc tray 8 is pulled out and the internal position of the housing 6 toward which the disc tray 8 is pushed back. When the disc tray 8 moves to the external position, the optical disc 4 can be mounted on the disc tray 8 (or taken out from the disc tray 8).

It should be noted that as FIGS. 3A and 3B illustrate, a clamper 29 for clamping the optical disc 4 is placed above the disc tray 8. The lower surface of the clamper 29 has a protrusion 29a for alignment.

[Configuration of Loader Unit]

As FIGS. 2 to 4 illustrate, the loader unit 10 includes a loader body 14 and a traverse unit 16 attached to the loader body 14 to be vertically movable.

The traverse unit 16 includes a traverse chassis 18. A rear end portion 18a of the traverse chassis 18 is attached to the loader body 14 with a pair of screws 20. A pair of dampers 22 made of rubber or other material is provided between the rear end portion 18a of the traverse chassis 18 and the loader body 14. The cushioning effect of the pair of dampers 22 allows a front end portion 18b of the traverse chassis 18 to ascend and descend in the Z-axis direction. Here, the rear end portion 18a is used as the center of rotation. It should be noted that the front end portion 18b of the traverse chassis 18 rises almost vertically from the flat portion of the traverse chassis 18.

An ascending and descending mechanism provided in the loader body 14 allows the traverse chassis 18 to ascend and descend in the Z-axis direction in association with the operation of the disc tray 8. Specifically, the traverse chassis 18 ascends relative to the loader body 14, in the direction represented by the arrow M in FIG. 3A, in association with the movement of the disc tray 8 to the position toward which the disc tray 8 is pushed back. Moreover, the traverse chassis 18 descends relative to the loader body 14, in the direction represented by the arrow N in FIG. 3B, in association with the movement of the disc tray 8 to the position toward which the disc tray 8 is pulled out. It should be noted that the ascending and descending mechanism for moving up and down the traverse chassis 18 and a guide mechanism for limiting the ascending and descending motion of the traverse chassis 18 to the vertical direction (i.e., Z-axis direction) will be described later.

A spindle motor 24 is attached to the traverse chassis 18. A turntable 28 for mounting the optical disc 4 is attached to an output shaft 26 of the spindle motor 24. The spindle motor 24 rotates the turntable 28. It should be noted that the upper surface of the turntable 28 has a hole 28a for alignment.

As FIG. 3B illustrates, when the traverse chassis 18 ascends relative to the loader body 14 and is positioned at a clamp position, the turntable 28 protrudes above the bottom of the disc tray 8 through the opening 12. This movement of the turntable 28 lifts the optical disc 4 from the disc tray 8. This allows the clamper 29 to clamp the optical disc 4 between the clamper 29 and the turntable 28. When the spindle motor 24 rotates the turntable 28 in this state, the optical disc 4 rotates together with the turntable 28.

It should be noted that as FIG. 3B illustrates, the ascent of the traverse chassis 18 relative to the loader body 14 inserts the protrusion 29a of the clamper 29 into the hole 28a of the turntable 28. This aligns the turntable 28 and the clamper 29 (i.e., the adjustment is performed to match the central axis of the turntable 28 with the central axis of the clamper 29). Meanwhile, as shown in FIG. 3A, the descent of the traverse chassis 18 from the clamp position retracts the turntable 28 below the bottom of the disc tray 8. This allows the clamper 29 to release the clamp of the optical disc 4 (i.e., unclamp the optical disc 4). Therefore, the optical disc 4 is placed on the disc tray 8 again.

Furthermore, a stepping motor 30 is attached to the traverse chassis 18. A lead screw 32 is attached to the output shaft (not illustrated in the figure) of the stepping motor 30. The lead screw 32 is placed so that the longitudinal direction of the lead screw 32 is substantially in parallel with the radial direction of the optical disc 4 (i.e., Y-axis direction). The outer circumference surface of the lead screw 32 is provided with a groove 34 spirally extending in the longitudinal direction of the lead screw 32. The stepping motor 30 allows the lead screw 32 to rotate forward and backward in the directions represented by the arrows P and Q in FIG. 2.

A first guide shaft 36 and a second guide shaft 38 are also attached to the traverse chassis 18. The first guide shaft 36 and the second guide shaft 38 are placed substantially in parallel with each other, at an interval. Each of the first guide shaft 36 and the second guide shaft 38 extends substantially in parallel with the longitudinal direction of the lead screw 32. The first guide shaft 36 and the second guide shaft 38 reciprocatingly support in the Y-axis direction the optical pickup 40 for reading information recorded on the optical disc 4 and writing information to the optical disc 4.

A pair of first bearings 42a and 42b is provided at an end portion of the optical pickup 40 on the side where the first guide shaft 36 is located. A second bearing 44 is provided at an end portion of the optical pickup 40 on the side where the second guide shaft 38 is located. The first guide shaft 36 reciprocatingly supports the respective bearings of the pair of first bearings 42a and 42b. The second guide shaft 38 reciprocatingly supports the second bearing 44. This allows the optical pickup 40 to reciprocate along the first guide shaft 36 and the second guide shaft 38, in the directions represented by the arrows T and U in FIG. 2.

The optical pickup 40 is provided with an optical system for a BD and an optical system for a DVD and a CD. When the optical disc 4 is a BD, the optical system for a BD is used. When the optical disc 4 is a DVD or CD, the optical system for a DVD and a CD is used.

The optical system for a BD includes a first light source (not illustrated in the figure), a first object lens 46, and a first light receiving part (not illustrated in the figure). The first light source outputs a laser beam for a BD (e.g., a laser beam having a wavelength band of 405 nm). The first object lens 46 converges a laser beam emitted from the first light source on the information recording surface through the opening 12 of the disc tray 8. The first light receiving part receives the laser beam reflected off the information recording surface of the optical disc 4, through the opening 12 of the disc tray 8.

The optical system for a DVD and a CD includes a second light source (not illustrated in the figure), a second object lens 48, and a second light receiving part (not illustrated in the figure). The second light source selectively outputs a laser beam for a DVD (e.g., a laser beam having a wavelength band of 650 nm) and a laser beam for a CD (e.g., a laser beam having a wavelength band of 780 nm). The second object lens 48 converges a laser beam emitted from the second light source on the information recording surface of the optical disc 4, through the opening 12 of the disc tray 8. The second light receiving part receives the laser beam reflected off the information recording surface of the optical disc 4, through the opening 12 of the disc tray 8.

The optical pickup 40 is equipped with a rack 50 for converting the rotational movement of the lead screw 32 into the linear movement of the optical pickup 40. The rack 50 includes an attachment part 52, a movement part 54, and a pair of connection parts 56.

The attachment part 52 is attached to the optical pickup 40 with a screw 58. The movement part 54 is reciprocatingly mounted to the lead screw 32. The movement part 54 is connected with the attachment part 52 via the pair of connection parts 56. A claw part (not illustrated in the figure) fitted into the groove 34 of the lead screw 32 is provided inside the movement part 54. The rotation of the lead screw 32 moves the claw part along the groove 34 of the lead screw 32. This means that the movement part 54 moves along the lead screw 32.

When the lead screw 32 rotates in the direction represented by the arrow P in FIG. 2, the movement part 54 moves along the lead screw 32, in the direction represented by the arrow R in FIG. 2. With this movement of the movement part 54, the optical pickup 40 linearly moves in the direction represented by the arrow T in FIG. 2, i.e., from the inner radius to the outer radius of the optical disc 4.

Meanwhile, when the lead screw 32 rotates in the direction represented by the arrow Q in FIG. 2, the movement part 54 moves along the lead screw 32, in the direction represented by the arrow S in FIG. 2. With this movement of the movement part 54, the optical pickup 40 linearly moves in the direction represented by the arrow U in FIG. 2, i.e., from the outer radius to the inner radius of the optical disc 4.

[Respective Configurations of Ascending and Descending Mechanism and Guide Mechanism]

Figure 5A:
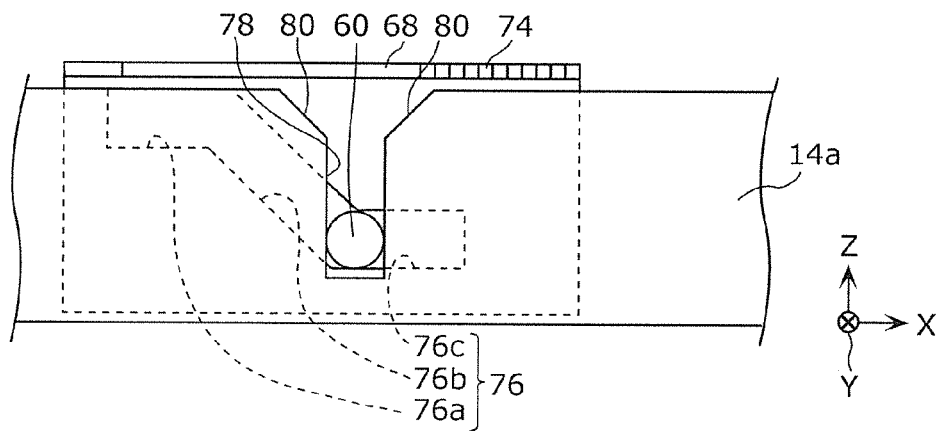
FIG. 5A illustrates a guide mechanism in the state where an optical disc is unclamped.
Figure 5B:
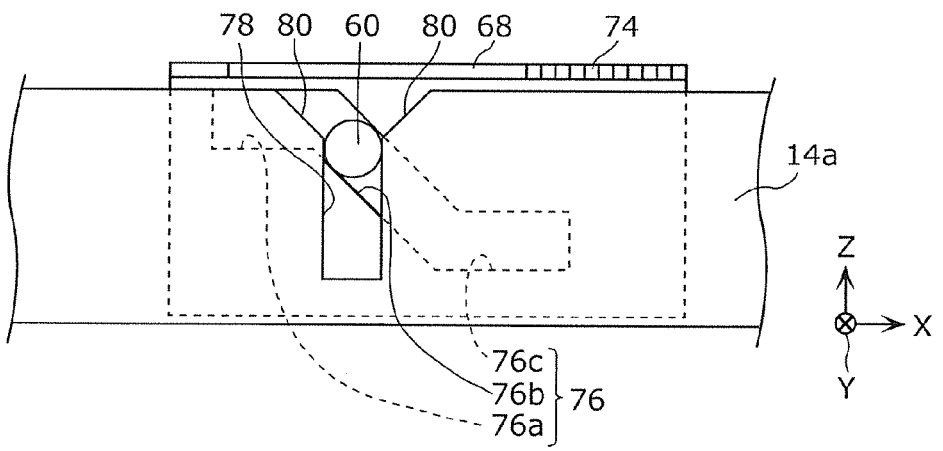
FIG. 5B illustrates a guide mechanism in the state where alignment between a turntable and a clamper is started.
Figure 5C:
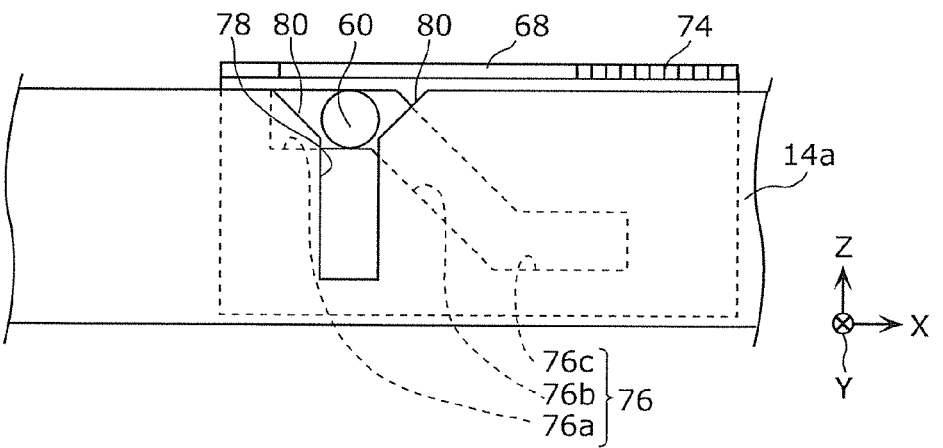
FIG. 5C illustrates a guide mechanism in the state where an optical disc is clamped.

With reference to FIGS. 2 to 5C, the following describes the respective configurations of an ascending and descending mechanism for moving the traverse chassis 18 up and down and a guide mechanism for limiting the ascending and descending motion of the traverse chassis 18 to the vertical direction. FIG. 5A illustrates the guide mechanism in the state where the optical disc is unclamped. FIG. 5B illustrates the guide mechanism in the state where the alignment of the turntable and the clamper is started. FIG. 5C illustrates the guide mechanism in the state where the optical disc is clamped.

The ascending and descending mechanism and the guide mechanism are common in that a protrusion 60 protrudes from the front end portion 18b of the traverse chassis 18 in the Y-axis direction. The protrusion 60 has, for example, a cylindrical shape.

The following describes the configuration of the ascending and descending mechanism. With reference to FIGS. 2 to 5C, the ascending and descending mechanism includes, in addition to the protrusion 60, a motor 62, a first drive gear 64, a second drive gear 66, and a cam slider 68.

The motor 62 is attached to the loader body 14. Each of the first drive gear 64 and the second drive gear 66 is attached to the loader body 14 so as to rotate forward and backward. The first drive gear 64 meshes with the second drive gear 66. The first drive gear 64 is drivingly connected to an output shaft 70 of the motor 62 via a driving belt 69. The second drive gear 66 is provided with a pinion 72.

The cam slider 68 is reciprocatingly attached to the loader body 14 in the X-axis direction. The cam slider 68 has a rack 74. The rack 74 meshes with the pinion 72 of the second drive gear 66.

The rotation of the output shaft 70 of the motor 62 is transmitted to the first drive gear 64 and the second drive gear 66 via the driving belt 69. When the pinion 72 rotates with the rotation of the second drive gear 66, the rack 74 moves relative to the pinion 72. This allows the cam slider 68 to reciprocate in the directions represented by the arrows V and W in FIG. 2.

The cam slider 68 further has a cam groove 76. With reference to FIGS. 5A to 5C, the cam groove 76 includes a first groove portion 76a, a second groove portion 76b, and a third groove portion 76c. The second groove portion 76b extends inclining against the X-axis direction. The first groove portion 76a extends from the upper end of the second groove portion 76b in the X-axis direction. The third groove portion 76c extends from the lower end of the second groove portion 76b in the X-axis direction.

The following describes the configuration of the guide mechanism. As FIGS. 3 to 5C illustrate, the guide mechanism includes, in addition to the protrusion 60, a guiding recess 78, 80 in the loader body 14. The loader body 14 has an attachment wall 14a extending in the Z-axis direction, and the attachment wall 14a has the guiding recess 78, 80. The guiding recess 78, 80 includes a first part (recess 78) and a second part (slopes 80). The recess 78 linearly extends in the Z-axis direction (i.e., the direction substantially perpendicular to the radial direction of the optical disc 4). The width (i.e., the width in the horizontal direction in FIGS. 5A to 5C) of the recess 78 is set to be slightly greater (e.g., not greater than 1 mm) than the diameter of the protrusion 60. The open upper end of the recess 78 is connected to the slopes 80 (forming a wide portion) which slope against the direction in which the recess 78 extends. The width of the wide portion including the slopes 80 is greater than the width of the recess 78, and decreases towards the recess 78.

The protrusion 60 of the traverse chassis 18 penetrates through the cam groove 76 of the cam slider 68, and is movably inserted into the recess 78 of the loader body 14.

[Ascending and Descending Motion of Traverse Chassis]

The following describes the ascending and descending motion of the traverse chassis 18. The following description relates to the ascending motion of the traverse chassis 18. In the state where the traverse chassis 18 is at the lowest position relative to the loader body 14 (ref FIG. 3A), the protrusion 60 is positioned in the third groove portion 76c and at the lower end of the recess 78 as FIG. 5A illustrates. The forward rotation of the motor 62 in this state moves the cam slider 68 in the direction represented by the arrow W in FIG. 2. This, as FIG. 5B illustrates, moves the protrusion 60 from the third groove portion 76c to the second groove portion 76b, and guides the protrusion 60 upward along the recess 78. Thus, the action of the ascending and descending mechanism moves up the traverse chassis 18 in the direction represented by the arrow M in FIG. 3A, and the action of the guide mechanism limits the ascending motion to the vertical direction.

When the alignment of the turntable 28 and the clamper 29 is started, the protrusion 60 is guided to the upper end of the recess 78 as FIG. 5B illustrates. This starts the alignment of the turntable 28 and the clamper 29 in the state where the ascending motion of the traverse chassis 18 is limited to the vertical direction. Therefore, the occurrence of misalignment can be suppressed.

After the alignment starts in this way, the cam slider 68 further moves in the direction represented by the arrow W in FIG. 2. This, as FIG. 5C illustrates, moves the protrusion 60 from the second groove portion 76b to the first groove portion 76a. Thus, the protrusion 60 is moved above the upper end of the recess 78, and positioned inside the slopes 80. In this state, as FIG. 3B illustrates, the traverse chassis 18 ascends to the highest position relative to the loader body 14 (i.e., clamp position), and the clamper 29 clamps the optical disc 4 between the clamper 29 and the turntable 28. It should be noted that when the alignment of the turntable 28 and the clamper 29 is completed (i.e., when the traverse chassis 18 is at the clamp position), the protrusion 60 is positioned inside the slopes 80 as FIG. 5C illustrates.

The following description relates to the descending motion of the traverse chassis 18. In the state where the traverse chassis 18 is at the highest position relative to the loader body 14 (i.e., clamp position) (ref FIG. 3B), the protrusion 60 is positioned in the first groove portion 76a and inside the slopes 80 as FIG. 5C illustrates. The backward rotation of the motor 62 in this state moves the cam slider 68 in the direction represented by the arrow V in FIG. 2. This, as FIG. 5B illustrates, moves the protrusion 60 from the first groove portion 76a to the second groove portion 76b, and guides the protrusion 60 downward along the recess 78. Thus, the action of ascending and descending mechanism moves down the traverse chassis 18 in the direction represented by the arrow N in FIG. 3B, and the action of the guide mechanism limits the descending motion to the vertical direction. The descent of the traverse chassis 18 relative to the loader body 14 allows the clamper 29 to unclamp the optical disc 4.

It should be noted that when the traverse chassis 18 starts descending from the clamp position, the horizontal swing of the traverse chassis 18 may cause the protrusion 60 to ride on the slope 80. In this case, when the protrusion 60 moves obliquely downward along the slope 80, the protrusion 60 is positioned at the upper end of the recess 78.

After that, the cam slider 68 further moves in the direction represented by the arrow V in FIG. 2. Thus, as FIG. 5A illustrates, the protrusion 60 moves from the second groove portion 76b to the third groove portion 76c, and is guided downward along the recess 78 to the lower end of the recess 78. In this state, as FIG. 3B illustrates, the traverse chassis 18 is at the lowest position relative to the loader body 14.

The following describes advantages obtained from the optical disc device 2 of the present embodiment. As described above, when the traverse chassis 18 is at a position lower than the clamp portion, the protrusion 60 is guided along the recess 78. When the traverse chassis 18 is at the clamp position, the protrusion 60 is positioned inside the slopes 80. Therefore, rattling does not occur between the protrusion 60 and the recess 78 when the traverse chassis 18 oscillates with the rotation of the optical disc 4. This can suppress the occurrence of an unusual sound.

Furthermore, the omission of the resin flat spring described in the background of the invention can suppress a force to hold down the protrusion 60 to the recess 78 to be relatively small. This can stabilize the ascending and descending motion of the traverse chassis 18.

Embodiment 2

Figure 6:
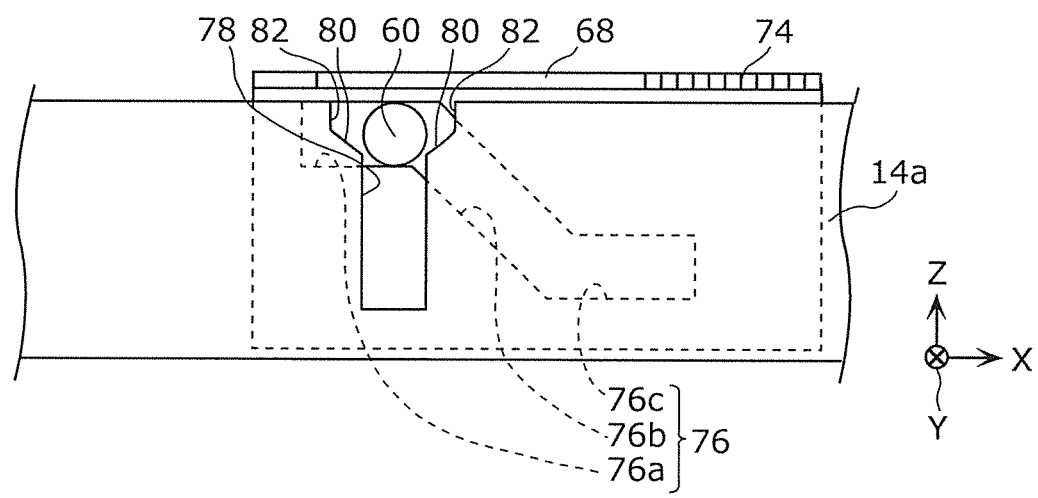
FIG. 6 illustrates a guide mechanism in an optical disc device according to Embodiment 2.
Figure 7:
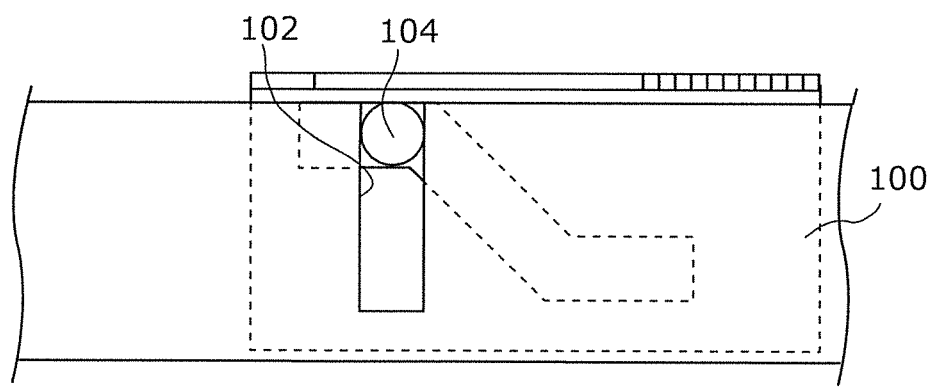
FIG. 7 illustrates a guide mechanism in a conventional optical disc device.

With reference to FIG. 6, the following describes a guide mechanism in an optical disc device according to Embodiment 2. FIG. 6 illustrates the guide mechanism in the optical disc device according to Embodiment 2. It should be noted that in the present embodiment, the same reference signs are given to structural elements that are identical to those in Embodiment 1. Thus, the explanation for these will be omitted here.

As FIG. 6 illustrates, in the guide mechanism in the optical disc device in the present embodiment, vertical portions 82 are connected to the upper ends of the slopes 80. The vertical portions 82 extend substantially perpendicularly to the upper surface of the attachment wall 14a. Even if the guide mechanism has such a configuration, similar effects to Embodiment 1 can be obtained.

The above describes the optical disc devices according to the embodiments of the present invention. However, the present invention is not limited to these embodiments. For example, the embodiments may be combined.

In the embodiments, the optical disc device is a BD recorder. However, other devices may be used and, the optical disc device may be, for example, a BD player for reproducing information recorded on an optical disc. Alternatively, the optical disc device may be, for example, a DVD recorder, a DVD player, or a CD player. In the embodiments, the protrusion has a cylindrical shape. However, the protrusion may take other shapes such as square pole. The protrusion may take any shape.

In the embodiments, the slopes extend linearly. However, the slopes may, for example, be curved.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

The optical disc devices according to the present invention are applicable as, for example, BD recorders.

The invention claimed is:

1. An optical disc device comprising:
a loader body having a guiding recess extending in a direction substantially perpendicular to a radial direction of an optical disc;
a traverse chassis provided in the loader body and having a protrusion guided along a part of the guiding recess, the traverse chassis being vertically movable;
a turntable attached to the traverse chassis, for mounting the optical disc; and
a clamper which clamps the optical disc between the clamper and the turntable when the traverse chassis ascends relative to the loader body to a clamp position, and unclamps the optical disc when the traverse chassis descends from the clamp position,
wherein the guiding recess includes:
a first part; and
a second part that is wider than the first part,
wherein, when the traverse chassis is at a position lower than the clamp position, the protrusion is guided along the first part of the guiding recess, and
when the traverse chassis is at the clamp position, the protrusion is positioned inside the second part of the guiding recess.

2. The optical disc device according to claim 1,
wherein the second part of the guiding recess includes slopes which slope relative to the direction in which the first part of the guiding recess extends.

3. The optical disc device according to claim 1, wherein:
when alignment between the turntable and the clamper is started, the protrusion is guided along the first part of the guiding recess; and
when the alignment between the turntable and the clamper is completed, the protrusion is positioned inside the second part of the guiding recess.

4. The optical disc device according to claim 2, wherein the second part of the guiding recess further includes vertical portions connected to upper ends of the slopes, and the vertical portions extend in the direction substantially perpendicular to the radial direction of the optical disc.

5. The optical disc device according to claim 1, wherein the second part of the guiding recess is connected to an open upper end of the first part of the guiding recess.

* * * * *